United States Patent

[11] 3,553,429

| [72] | Inventor | Raymond L. Nelson<br>Rochester, N.Y. |
|---|---|---|
| [21] | Appl. No. | 776,655 |
| [22] | Filed | Nov. 18, 1968 |
| [45] | Patented | Jan. 5, 1971 |
| [73] | Assignee | Eastman Kodak Company<br>Rochester, N.Y.<br>a corporation of New Jersey |

[54] TEMPERATURE CONTROL CIRCUIT
6 Claims, 2 Drawing Figs.

[52] U.S. Cl. .................................................. 219/497,
219/501, 219/499
[51] Int. Cl. ............................................... H05b 1/02
[50] Field of Search .......................................... 219/497,
499, 501, 494

[56] References Cited
UNITED STATES PATENTS
3,149,224 9/1964 Horne et al. .................. 219/501

3,175,077 3/1965 Fox et al. ...................... 219/494
3,443,121 5/1969 Weisbrod ...................... 219/497

*Primary Examiner*—Bernard A. Gilheany
*Assistant Examiner*—F. E. Bell
*Attorneys*—Robert W. Hampton and G. Herman Childress ABSTRACT: A temperature control circuit for accurately controlling the temperature of a medium includes a bridge which senses the temperature of the medium. The bridge supplies a signal representative of the temperature difference between the desired temperature and the actual temperature of the medium to a differential amplifier. A network coupled to the differential amplifier provides a visual indication of the temperature difference and amplifies the signal received from the differential amplifier. A relaxation oscillator network is coupled to the network to operate a triac. The triac controls a heater and thus regulates the temperature of the medium.

PATENTED JAN 5 1971

3,553,429

RAYMOND L. NELSON
INVENTOR.

BY J. Herman Childress

Robert W. Hampton

ATTORNEYS

TEMPERATURE CONTROL CIRCUIT

BACKGROUND OF THE INVENTION

This invention relates to a solid state electronic temperature control circuit and, more particularly, this circuit relates to an electronic temperature control circuit for automatically regulating or controlling a heater in an AC power circuit.

The use of a DC control circuit to regulate a heater circuit is known in the art. A control circuit of this nature is disclosed in "IBM Technical Disclosure Bulletin," Vol. 8, No. 5, Oct. 1965, on pages 808 and 809. This circuit contains a temperature sensing bridge having a thermistor in one leg which supplies a signal to a differential amplifier. The differential amplifier output charges a capacitor for biasing a unijunction transistor to its conductive state. The discharge through the unijunction transistor operates two silicon-controlled rectifiers which in turn control the current flow in a heater circuit.

U.S. Pat. 3,149,224 issued Sept. 15, 1964 to Horne discloses a temperature control circuit comprising a temperature sensing bridge, a relaxation oscillator, and a silicon-controlled rectifier which is used to switch on and off an AC heater circuit.

Canadian Pat. No. 776,839 issued Jan. 23, 1968 to Pinckaers discloses the use of transformers to isolate a DC control circuit from an AC heater circuit.

Prior art devices such as those referred to above, do not provide for visual indication of the temperature difference between the desired and actual temperatures over a very broad range, particularly where high gain differential amplifiers are required and wherein the desired visual indication is obtained from the amplified signal. This is because high gain amplifiers have an approximately linear output only over a very narrow range. For accurate metering to be achieved, the signal to be amplified should be linear, and thus the metering is limited to this range of amplification. Accurate visual indicating means are quite important, particularly in certain processing apparatus such as photographic processors where temperature differentials beyond an acceptable value may result in unsatisfactory results and wherein high volume production of the apparatus may result in substantial financial loss due to inaccurate process controls. Accordingly, it is quite desirable to provide very accurate visual indication means which will allow the operator of a device (such as a photographic processor) to determine quite accurately whether or not the device is operating within the necessary (and limited) temperature range. Moreover, in order to achieve accurate control of an AC power circuit, such as a heater circuit, the heater should be controlled in a very sensitive manner, such as by the use of a triac.

SUMMARY OF THE INVENTION

Accordingly, among the several objects of the invention may be noted the provision of an accurate temperature control circuit which provides a sensitive visual indication of the actual temperature of the medium being controlled. Another object of the invention is to provide a temperature control circuit capable of maintaining the temperature of a liquid medium very close to the desired temperature, e.g., to within about 0.1° F of desired temperature. Another object of the invention is to provide a temperature control circuit which allows the desired temperature to be easily set. Other objects and advantages of the invention will become apparent from the following description of the invention.

In accordance with the present invention, the disadvantages of the prior art mentioned before are avoided and the advantages of the present invention are achieved by providing an electronic temperature control means wherein semiconductive switching means (e.g., a triac) controls current flow to a temperature regulating device such as a heater. Control circuitry is provided for operating the switching means. This control circuitry includes sensing means for detecting the temperature of a medium and for generating a signal indicative of the differential between the actual temperature of the medium and a reference temperature. A network operatively connected to the sensing means amplifies the signal and provides an accurate visual indication of the temperature as indicated by the signal prior to such amplification. The network includes a variable resistance for adjusting the reference temperature. Means coupled to the network and to the switching means operates the switching means in response to the signal received from the network.

The invention, and its objects and advantages, will become more apparent from the detailed description of a preferred embodiment presented below.

BRIEF DESCRIPTION OF THE DRAWING

In the Drawing.

In the detailed description of the preferred embodiment of the invention presented below, reference is made to the accompanying drawing, in which.

Corresponding reference characters indicate corresponding parts of the circuits throughout the two views of the drawing.

DESCRIPTION OF THE PREFERRED EMBODIMENTS

Figure 1:
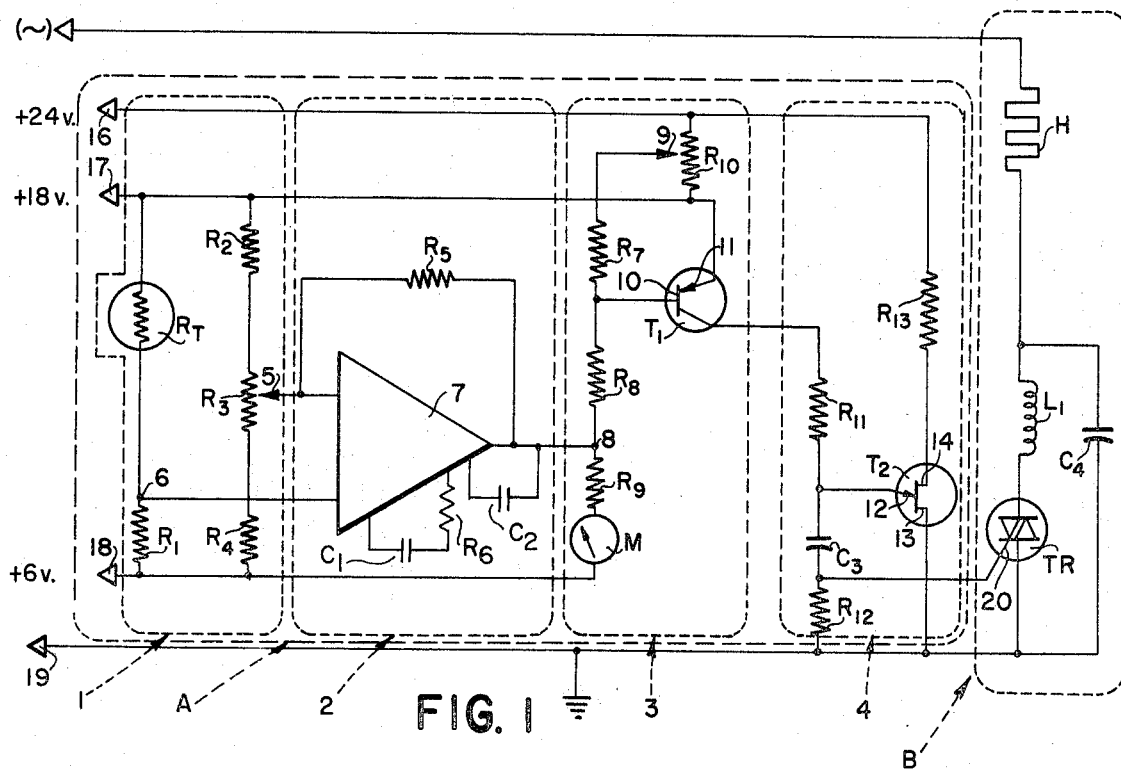
FIG. 1 illustrates a preferred specific embodiment of a temperature control circuit of this invention.

Referring now to FIG. 1, an electronic temperature control circuit of this invention generally comprises a DC control circuit A for regulating current flow in an AC heater circuit B. Circuit A includes a temperature sensing bridge, generally designated 1, which supplies a signal to a differential amplifier network shown generally at 2, the signal being representative of the temperature difference between the desired or reference temperature of a fluid or solid medium and the actual temperature of that medium. Network 2 is connected across bridge 1 and amplifies the signal from the bridge and supplies the amplified signal to a network 3. Network 3 provides a visual indication of the temperature differential sensed by bridge 1 and further amplifies the signal received from network 2. The amplified signal from network 3 is supplied to a relaxation oscillator network, generally designated 4, which is capable of generating a negative pulse of sufficient magnitude in response to the signal received from network 3 to turn on a triac TR, thereby allowing current to flow in heater circuit B.

More specifically, the temperature sensing bridge 1, known generally as a wheatstone bridge, comprises resistors $R_1$, $R_2$, $R_4$, potentiometer $R_3$ and a thermistor $R_t$. The output of bridge 1 is provided through a sweeper arm 5 of potentiometer $R_3$ and through the junction 6 between thermistor $R_t$ and resistor $R_1$ to network 2. A DC voltage of +18 volts is applied to resistor $R_2$ and thermistor $R_t$ due to the direct connection to DC source 17. Similarly a DC voltage of +6 volts is applied to resistors $R_1$ and $R_4$ by a direct connection to DC source 18, so that the voltage across the bridge is 12 volts. The thermistor $R_t$ is positioned so that it can sense the temperature of the medium to be heated.

The resistance of thermistor $R_t$ varies with the temperature of the medium it senses. Thus the resistance of the thermistor $R_t$ at any given time is indicative of the temperature of the medium. Temperature sensing bridge 1 has appropriate resistive values for resistors $R_1$, $R_2$, $R_3$ and $R_4$ so that at a certain temperature of the medium, referred to as the null temperature, the resistance of the thermistor $R_t$ is such that the potential at the two inputs from 5 and 6 to network 2 is the same. Temperature sensing bridge 1 is balanced under these conditions.

Sweeper arm 5 of potentiometer $R_3$ is adjustable to vary the balance point of bridge 1, which represents the null temperature. The null temperature may be the same as the desired or reference temperature but need not be so and should not be confused with the reference temperature. As will be explained more fully hereinafter, the reference temperature signal is determined by the setting of sweeper arm 5 of potentiometer $R_3$ and by an adjustment provided for in network 3. Consequently, the setting of sweeper arm 5 of potentiometer $R_3$ varies the null temperature and also the reference temperature signal.

When the temperature of the medium varies from the null temperature, bridge 1 becomes unbalanced because the resistance of thermistor $R_t$ changes. Therefore the input supplied to differential amplifier network 2 varies as the temperature of the medium. The further the temperature of the medium varies from the null temperature, the more the resistance of the thermistor $R_t$ changes (and the more bridge 1 becomes unbalanced), thereby creating a larger voltage difference between sweeper arm 5 and junction 6.

Differential amplifier network 2 includes a suitable differential amplifier 7, a feedback resistor $R_5$, and frequency compensating components comprising resistor $R_6$ and capacitors $C_1$ and $C_2$. Network 2 receives an input signal corresponding to the temperature difference between the temperature of the medium and the reference temperature, amplifies that signal, and supplies the amplified signal to network 3.

While differential amplifier 7 can be any of several appropriate devices, a silicon integrated circuit differential amplifier is preferred. The frequency compensating components (resistor $R_6$, capacitors $C_1$ and $C_2$) may or may not be required, depending on the particular differential amplifier used. Feed back resistor $R_5$ determines the gain of the amplifier.

Differential amplifiers in general act as linear devices only over a limited range. The range over which a differential amplifier acts as a linear device depends (among other things) upon the gain of the amplifier; i.e., the higher the gain of the amplifier, the more narrow the range over which the amplifier acts as a linear device. Feedback resistor $R_5$, by reducing the gain of the amplifier, also increases the range over which the amplifier acts as a linear device. As explained later, this permits metering of the temperature of the medium over a broad range.

Differential amplifier network 2 is connected across temperature sensing bridge 1 in the manner shown so that the output from the differential amplifier network 2 decreases when the temperature of the medium decreases, provided that the reference temperature has not been decreased by an adjustment of sweeper arm 5 of potentiometer 3. Conversely, when the temperature of the medium increases, the output of network 2 increases.

Network 3 comprises a milliammeter or other metering element designated M, resistors $R_7$, $R_8$ and $R_9$, potentiometer $R_10$, and transistor $T_1$ having a base electrode 10 and an emitter electrode 11. Emitter 11 of transistor $T_1$ is maintained at a potential of +18 volts due to its direct connection to the DC source 17. Base 10 of transistor $T_1$ is connected to the junction of resistor $R_7$ and resistor $R_8$. Milliammeter M and resistor $R_9$ are connected between junction 8 and the 6 volt DC power supply 18. Network 3 receives the amplified output from network 2 at junction 8 between resistors $R_8$ and $R_9$.

As the temperature of the medium decreases (and assuming that the reference temperature is not decreased by an adjustment of sweeper arm 5 on potentiometer 3) the output of differential amplifier network 2 decreases, thus tending to decrease the potential at junction 8. This tends to decrease the potential at base 10 of transistor $T_1$, thus increasing the potential difference between emitter 11 and base 10 of transistor $T_1$, and thereby tending to turn on transistor $T_1$. Conversely, as the temperature of the medium increases, the output of differential amplifier 2 increases. This raises the potential at junction 8 which tends to increase the potential at base 10 of transistor $T_1$ thereby decreasing the potential difference between emitter 11 and base 10 of transistor $T_1$. This tends to bias transistor $T_1$ off. A base current flows from emitter 11 to base 10 of transistor $T_1$ when transistor $T_1$ is on, thereby causing the current through resistor $R_8$ to be greater than the current through resistor $R_7$.

The reference or desired temperature of the medium can be adjusted not only by moving sweeper arm 5 on potentiometer 3 but also by moving sweeper arm 9 on potentiometer $R_10$. Movement of arm 9 alters the bias current through resistor $R_7$. This movement of the sweeper arm 9 adjusts the reference temperature because it is the setting of sweeper arm 9 together with the output on network 2 that determines the potential at base 10 of transistor $T_1$ and, as previously indicated, it is this potential which determines whether transistor $T_1$ is on or off. As was previously explained, the output from network 2 is determined by the temperature of the medium. Thus if the temperature of the medium decreases, the output of network 2 decreases; and, conversely, if the temperature of the medium increases, then the output of network 2 increases. If the temperature of the medium is at the reference temperature, then any increase in the bias current through resistor $R_7$ caused by adjusting sweeper arm 9 on potentiometer $R_10$ will result in transistor $T_1$ being off. Conversely, if the bias current through resistor $R_7$ is decreased, then transistor $T_1$ will be on. Thus if sweeper arm 9 is adjusted to increase the bias current through resistor $R_7$, the transistor will not be turned on until the output of network 2, which depends on the temperature of the medium, is reduced by a corresponding amount. In other words, the transistor will be turned off at a lower temperature. Conversely, if the bias current through resistor $R_7$ is decreased, the transistor will not be turned off until the output of network 2 is increased by a corresponding amount. Consequently, transistor $T_1$ will be turned off only at a higher temperature of the medium. Therefore it follows that adjustment of sweeper arm 9 can be used to set the temperature at which transistor $T_1$ is turned off. As will be explained more fully hereinafter, the output of network 3 (which depends upon whether transistor $T_1$ is off or on) indirectly operates a temperature control device for regulating the temperature of the medium. Accordingly, adjustment of sweeper arm 9 can be used for setting the desired or reference temperature at which the medium is to be maintained.

As was previously discussed, the output of differential amplifier network 2 is a potential appearing at junction 8 which is directly proportional to the temperature differential between the reference temperature and the temperature of the medium. Milliammeter M is connected between junction 8 and +6 volt DC power supply 18 to provide an accurate visual indication of this temperature differential.

The combination of resistors $R_7$, $R_8$, $R_10$, and transistor $T_1$ of network 3 is capable of further amplifying the signal received from differential amplifier network 2 so that the signal supplied to circuitry 4 from network 3 is sufficient in magnitude to operate a unijunction transistor $T_2$ in circuitry 4.

The relaxation oscillator circuitry 4 comprises resistors $R_{11}$, $R_{12}$, $R_{13}$, a capacitor $C_3$, and unijunction transistor $T_2$. Transistor $T_2$ has an emitter 12 connected to the junction of resistor $R_{11}$ and capacitor $C_3$. Transistor $T_2$ also has a first base electrode 13 connected to the common line 19 and a second base electrode 14 connected to resistor $R_{13}$. A constant DC potential is applied to second base 14 of transistor $T_2$ through resistor $R_{13}$. The junction of capacitor $C_3$ and resistor $R_{12}$ is connected to the gate or control terminal 20 of triac TR. Circuitry 4 is capable of generating at gate 20 a negative pulse having sufficient magnitude to switch on triac TR.

When the temperature of the medium is below that of the reference temperature, transistor $T_1$ conducts and charges capacitor $C_3$ through resistor $R_{11}$. Charge continues to be built up on capacitor $C_3$ until the voltage at emitter 12 with respect to first base 13 is sufficiently high to trigger unijunction transistor $T_2$ into a conductive state. When the voltage at emitter 12 with respect to the voltage at first base 13 of transistor $T_2$ reaches the unijunction transistor threshold voltage, capacitor $C_3$ rapidly discharges through transistor $T_2$. The rapid discharge of capacitor C produces a negative pulse at gate 20 sufficient in magnitude to turn on triac TR, thereby causing current to be supplied to heater load H.

Heater circuit B comprises heater H, triac TR, choke L, and capacitor $C_4$. Choke $L_1$ and capacitor $C_4$ are optional components but are desirable for reducing the amount of high frequency interference generated when triac TR is switched. Triac TR AC heater circuit B is capable of being switched on regardless of the direction of current flow in heater circuit B at any instant in time. When the current in heater circuit B changes direction, triac TR is switched off and must be switched on every time the current in heater circuit B changes direction (if heater H is going to continue to be on). Triac TR in this way controls the current flow in both directions, thereby achieving precise regulation of heater H. For example, the temperature of a liquid medium has been maintained within approximately 0.1° F of the reference temperature when appropriate component values were used and the heater H and the thermistor $R_t$ were properly located with respect to the liquid medium.

Figure 2:
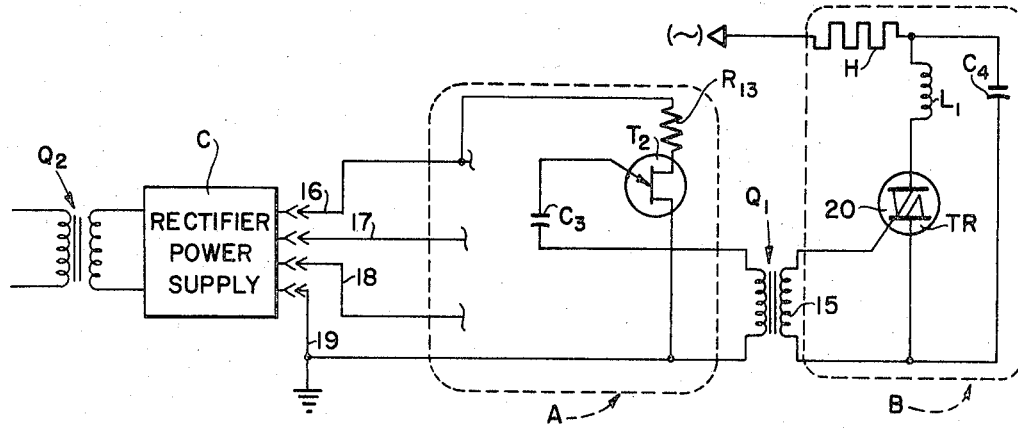
FIG. 2 shows a second embodiment of the invention which includes means for isolating an AC portion of the illustrated circuit from a DC portion thereof.

A second embodiment of the temperature control circuit of this invention is shown in FIG. 2. This embodiment includes a power transformer $Q_2$ Which supplies AC power to a rectifier power supply generally designated C. Control circuit A of the second embodiment is identical with control circuit A of the first embodiment shown in FIG. 1 except for a pulse transformer $Q_1$ which is substituted for resistor $R_{12}$ of the first embodiment.

The rectifier power supply is of a conventional design and thus the details of this power supply have not been delineated. Rectifier power supply C is preferably used in both embodiments of this invention to obtain the DC potentials of +24 volts (for line 160, +18 volts (for line 17), +6 volts (for line 18), with respect to the common (line 19). These DC potentials are supplied to the control circuit designated A in each embodiment of this invention. Secondary winding 15 of transformer $Q_1$ is used to transfer the negative pulse to the control terminal of triac TR for switching the triac on in the second embodiment. Pulse transformer $Q_1$ and power transformer $Q_2$ are used to isolate thermistor $R_t$ and differential amplifier 7 of control circuit A from the AC line. As a practical matter this is often desirable.

Operation of the circuits of the invention will now be described. Temperature sensing bridge 1 generates a signal indicative of the temperature differential between the desired or reference temperature and the actual temperature of the medium. Differential amplifier network 2 amplifies that signal, and the amplified signal is supplied to network 3. Network 3 provides a visual indication of the temperature differential and either further amplifies the signal or arrests the signal as explained more fully hereinafter. Metering occurs before this amplification, and thus accurate metering is obtainable over a broad temperature range. The further amplified signal, if there is one, is then supplied to a relaxation oscillator network 4. When a sufficient amount of current has been supplied to network 4 to charge capacitor $C_3$ to the threshold potential of transistor $T_2$, network 4 will generate a negative pulse to turn on triac TR, and thereby allow current to flow in heater circuit B. In the FIG. 1 embodiment, the negative pulse is provided directly to the triac, while in the FIG. 2 embodiment the pulse is provided to the triac through transformer $Q_1$.

The reference temperature is set by adjusting sweeper arm 5 on potentiometer $R_3$ and/or by adjusting sweeper arm 9 on potentiometer $R_{10}$. Adjusting sweeper arm 5 on potentiometer $R_3$ varies the signal supplied to the differential amplifier, and this is reflected in the differential amplifier output. This output is indicative of the temperature differential between the reference temperature and the actual temperature of the medium. The setting of sweeper arm 9 on potentiometer $R_{10}$ sets the reference temperature by determining the differential amplifier output necessary to turn on transistor $T_1$. Consequently, either or both of the adjustments can be used to set the reference temperature.

Assuming that the reference temperature is set, then when the temperature of the medium drops below the reference temperature, the signal supplied to differential amplifier 2 changes, thereby reflecting the decreasing medium temperature, and thus the output of differential amplifier network 2 decreases. This decreased output will turn transistor $T_1$ on, thereby causing current to be supplied to relaxation oscillator network 4 from line 16. Network 4 generates a pulse which will turn on triac TR and thereby allow current to flow in heater circuit B.

Conversely, when the temperature of the medium increases above the reference temperature, the output of the differential amplifier increases thereby biasing transistor $T_1$ off. When transistor $T_1$ is off, no current is supplied to relaxation oscillation network 4 and consequently no pulse is generated to turn on the triac. Since the triac is switched off each time the current in the AC heater circuit changes direction, the triac and thus the heater will be off and will remain off.

The temperature control device has been specified as being a heater to aid in describing and understanding the circuit, but it will be understood that a refrigerant or other temperature control device may be used in place of the heater, provided corresponding changes are made to the circuitry so it acts in an opposite phase.

The invention has been described in detail with particular reference to preferred embodiments thereof, but it will be understood that variations and modifications can be effected within the spirit and scope of the invention.

I claim:

1. Electronic temperature control means for detecting the temperature of a medium and for regulating the temperature of the medium with respect to a reference temperature by operating an electrically operative regulating device, said control means comprising:
   a. semiconductive switching means for controlling current flow to the regulating device, said switching means having a control terminal; and
   b. a control circuit coupled to said control terminal for operating said switching means, said control circuit comprising:
      1. sensing means for producing a signal indicative of a temperature differential between the temperature of said medium and the reference temperature, said sensing means having a portion positionable in heat sensing relation to the medium to detect the temperature of the medium;
      2. differential amplification means having an input coupled to said sensing means and an output, said amplification means being operative to receive and amplify said signal generated by said sensing means;
      3. a network having an input coupled to the output said differential amplification means for receiving an amplified signal therefrom, said network comprising second amplification means for further amplifying said signal, and having indication means for indicating a temperature differential sensed by said sensing means, said indication means being coupled directly to the output of the differential amplifier for receiving the amplified signal from the differential amplifier means and prior to further amplification of such signal by the second amplification means, said network further comprising a variable resistance connected within said network so that adjustment of the variable resistance determines the reference temperature; and
      4. means having an input coupled to said network for receiving an amplified signal therefrom, and said last means having an output coupled to said control terminal of said semiconductive switching means for operating said switching means in response to a signal from said network.

2. Electronic temperature control means according to claim 1 wherein said amplification means of said network comprises a transistor having an emitter and a base; said variable resistance of said network comprises a potentiometer coupled to the emitter of said transistor and being adapted to be coupled to a DC voltage supply; said potentiometer having a sweeper arm connected through a resistor to said base of said transistor; said sweeper arm being adjustable to vary the bias current to said base of said transistor.

3. Electronic temperature control means according to claim 1 wherein said indication means of said network comprises a milliammeter coupled to the output of said amplifying means.

4. Electronic temperature control means according to claim 1 wherein said means coupled to said network comprises a unijunction 4, having an emitter, said means further comprises a capacitor coupled between said emitter of said unijunction transistor and said control terminal of said semiconductive switching means so that said capacitor will discharge rapidly through the unijunction transistor when charged to said threshold potential of said unijunction transistor, thereby generating a negative pulse at said control terminal of said switching means for regulating said switching means.

5. Electronic temperature control means according to claim 1 further comprising a rectifier power supply coupled to said control circuitry and adapted to be coupled to an AC power supply.

6. Electronic temperature control means for detecting the temperature of a medium and for regulating the temperature of the medium by operating a heater, said control means comprising:
  a. a triac for controlling current flow to the heater, said triac having a control terminal: and
  b. control circuitry coupled to said triac for operating said triac, said control circuitry comprising;
    1. a bridge for detecting the temperature of the medium and for generating a signal indicative of the temperature differential between the temperature of said medium and a reference temperature; said bridge comprising a thermistor positionable in heat sensing relation to the medium; said bridge further comprising a variable resistor for adjusting the reference temperature,
    2. a differential amplifier network connected across said bridge for receiving a signal indicative of said temperature differential from said bridge and for amplifying that signal,
    3. a network operatively connected to said differential amplifier and having amplification means for amplifying the signal received from the differential amplifier, said network further comprising visual indication means for providing a measurement of said temperature differential prior to amplification of the signal received by the network from the differential amplifier, said network further comprising a variable resistance connected in the network so that adjustment of the variable resistance adjusts the reference temperature; and
    4. relaxation oscillation circuitry coupled to said network for receiving an amplified signal therefrom, said relaxation oscillation circuitry being operable to generate a negative pulse in response to the signal received from said network, and said relaxation oscillation circuitry being coupled to said control terminal of said triac so that the generating of a negative pulse in response to said amplified signal operates said triac.

PO-1050
(5/69)

UNITED STATES PATENT OFFICE
CERTIFICATE OF CORRECTION

Patent No. 3,553,429          Dated May 27, 1971

Inventor(s) Raymond L. Nelson

It is certified that error appears in the above-identified patent and that said Letters Patent are hereby corrected as shown below:

Col. 7, line 6, "4" should be --transistor--.

Signed and sealed this 24th day of August 1971.

(SEAL)
Attest:

EDWARD M. FLETCHER, JR.
Attesting Officer

WILLIAM E. SCHUYLER, JR.
Commissioner of Patents